United States Patent
Kang et al.

(10) Patent No.: US 9,128,634 B1
(45) Date of Patent: Sep. 8, 2015

(54) SYSTEMS AND METHODS OF PACKED COMMAND MANAGEMENT FOR NON-VOLATILE STORAGE DEVICES

(71) Applicant: Marvell International Ltd., Hamilton (BM)

(72) Inventors: Xinhai Kang, Milipitas, CA (US); Qun Zhao, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/198,905

(22) Filed: Mar. 6, 2014

Related U.S. Application Data

(60) Provisional application No. 61/776,368, filed on Mar. 11, 2013.

(51) Int. Cl.
    *G06F 3/00*     (2006.01)
    *G06F 3/06*     (2006.01)

(52) U.S. Cl.
    CPC .............. *G06F 3/0659* (2013.01); *G06F 3/061* (2013.01); *G06F 3/0679* (2013.01)

(58) Field of Classification Search
    CPC ..................................................... G06F 3/0659
    USPC ........................................................ 710/5, 6
    See application file for complete search history.

(56) References Cited

U.S. PATENT DOCUMENTS

| | | | |
|---|---|---|---|
| 4,423,480 A | 12/1983 | Bauer | |
| 2005/0256983 A1 | 11/2005 | Ma | |
| 2006/0161707 A1* | 7/2006 | Davies et al. | 710/268 |
| 2006/0161709 A1* | 7/2006 | Davies | 710/268 |
| 2008/0270678 A1 | 10/2008 | Cornwell | |
| 2009/0172264 A1 | 7/2009 | Chung | |
| 2010/0161936 A1 | 6/2010 | Royer | |
| 2010/0312973 A1* | 12/2010 | Galbo et al. | 711/154 |
| 2013/0091307 A1 | 4/2013 | Lai | |
| 2013/0282927 A1 | 10/2013 | Zhao | |
| 2014/0108703 A1* | 4/2014 | Cohen et al. | 711/103 |

OTHER PUBLICATIONS

MultiMediaCard—Wikipedia, the free encyclopedia, http://en.wikipedia.org/wiki/MultiMediaCard, downloaded Dec. 30, 2013, pp. 1-5.

Huffman et al., Serial ATA Native Command Queuing, An Exciting New Performance Feature for Serial ATA, Jul. 2003, 12 pages.

* cited by examiner

*Primary Examiner* — Ernest Unelus

(57) ABSTRACT

The present disclosure includes systems and methods relating to packed command management for non-volatile storage devices. In some implementations, a device includes: a host controller configured to transfer data between a host memory and a storage device; and a non-transitory medium encoding host software configured to prepare a packed command, which represents more than one command, by loading pointers to memory blocks associated with the packed command into a host memory; wherein the host controller is configured to assert an interrupt to the host software, for at least one command of the packed command, after data transfer for the at least one command is completed, but before data transfer for all of the commands of the packed command is completed.

11 Claims, 3 Drawing Sheets

SYSTEMS AND METHODS OF PACKED COMMAND MANAGEMENT FOR NON-VOLATILE STORAGE DEVICES

CROSS REFERENCE TO RELATED APPLICATIONS

This disclosure claims the benefit of the priority of U.S. Provisional Application Ser. No. 61/776,368, filed Mar. 11, 2013 and entitled "eMMC Host Controller Enhancement to Improve Packed Command Latency", which is hereby incorporated by reference in its entirety.

BACKGROUND (1) Field of Use

The present disclosure describes systems and methods relating to packed command management for non-volatile storage devices.

(2) Description of Related Art

Computing apparatus often include embedded systems to control the operation of the underlying devices and to provide enhanced functionality and operational flexibility. Non-volatile memory can be included as a portion of the embedded system to store operating system program code, issued commands and data for operating the embedded system. Some embedded systems use solid state memory as non-volatile memory (e.g., electrically Erasable Read Only Memory (EEPROM)). Solid state memory may be used to accelerate applications to increase data access time, and may be advantageously programmed or re-programmed to provide non-volatile storage of information. Various standards have been defined for such non-volatile solid state memory devices, often referred to as flash memory. For example, MultiMediaCard (MMC) is a memory card standard that is based on a NAND-based flash memory. Further, the eMMC architecture puts MMC components (flash memory plus controller) into a small ball grid array (BGA) package for use in circuit boards as an embedded non-volatile memory system.

Due to historical reasons, eMMC does not support command queuing. To process a command, from the host to the device, each command goes through the following stages (taking a read command as an example): 1) the host prepares a command; 2) the host sends the command to the device; 3) the device receives the command; 4) the device processes the command and prepares the data; and 5) the device sends data to the host. Each stage takes time. The total time determines the IOPS (Input/Output Per Second). If command queuing were supported, the host could prepare and send more commands to the device when the device is handling a prior command so that part of the time consumed could be overlapped and overall IOPS could be improved.

To improve eMMC performance, starting from eMMC 4.5, the packed command was introduced. The packed command enables the host to send more than one command to the device. To achieve this, eMMC uses a solution different than typical command queuing. The eMMC packed command protocol is actually still single command based, but it uses multiple command phases. For example, if the host needs to send 10 read commands to the device, it does the following: 1) the host prepares a table in host memory, where this table includes information of the 10 commands; 2) the host prepares a WRITE command that is used to send the command table to the device; 3) the host sends the WRITE command to the device; 4) the host sends the data (a.k.a. the table) of the WRITE command to the device; 5) the device receives the WRITE command and the data, and the device interprets the command and data and knows it has 10 READ commands to process; 6) the host sends a READ command to the device; 7) the device receives the READ command, and the device can start to send data; 8) the device processes the 10 read commands received previously in the table; 9) the device sends data of the 10 read commands to the host (the data of the 10 commands must be strictly in order); and 10) the host completes all the 10 read commands once all data is received from the device. This packed command protocol can thus reduce the time for transferring commands from host to device and improve overall IOPS.

SUMMARY

The present disclosure includes systems and methods relating to packed command management for non-volatile storage devices. The described systems and methods can result in improved I/O latency in a device that employs packed commands and is backward compatible with a packed command protocol that is single command based. A host need not wait until all commands of a packed command are finished by the memory device. The multiple command phases of a packed command can be split apart, allowing the host to acknowledge (e.g., to the host file system) that one or more of the commands of a packed command have completed, while the memory device continues to process that same packed command. For example, the first often commands in a packed command could be completed and returned to the host file system once its data is received from the memory device instead of having to wait until data of all ten of the commands is received. By enabling a host device to detect command completion once data of a command in a packed command is received, instead of having to wait until data of all commands of the packed command is received, impact on command latency can be minimized.

According to an aspect of the disclosure, a system includes: a host memory to hold pointers to memory blocks associated with a packed command representing more than one command; a host controller coupled with the host memory to access the pointers to access the memory blocks associated with the packed command; and a storage device coupled with the host controller to send or receive data associated with the packed command provided by the host controller; wherein the host controller is configured to assert an interrupt to host software, for at least one command of the packed command, after data transfer for the at least one command is completed, but before data transfer for all of the commands of the packed command is completed.

The pointers can be contained in a scatter/gather list. The host controller can be configured to check a first bit in the scatter/gather list for the at least one command to determine that the interrupt should be asserted, and set a second bit in the scatter/gather list for the at least one command before the interrupt is asserted. The host software can set the first bit in the scatter/gather list for the at least one command to ask the host controller to assert the interrupt, and the host software can check the second bit in the scatter/gather list when processing the asserted interrupt. Moreover, the storage device can include an eMMC (embedded MultiMediaCard) flash memory device.

According to another aspect of the disclosure, a method includes: transferring data between a host memory and a storage device; processing a packed command, which represents more than one command, using pointers to memory blocks associated with the packed command; and asserting an interrupt to host software, for at least one command of the packed command, after data transfer for the at least one command is completed, but before data transfer for all of the commands of the packed command is completed.

According to another aspect of the disclosure, a device includes: a host controller configured to transfer data between a host memory and a storage device; and a non-transitory medium encoding host software configured to prepare a packed command, which represents more than one command, by loading pointers to memory blocks associated with the packed command into a host memory; wherein the host controller is configured to assert an interrupt to the host software, for at least one command of the packed command, after data transfer for the at least one command is completed, but before data transfer for all of the commands of the packed command is completed.

The described systems and methods can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
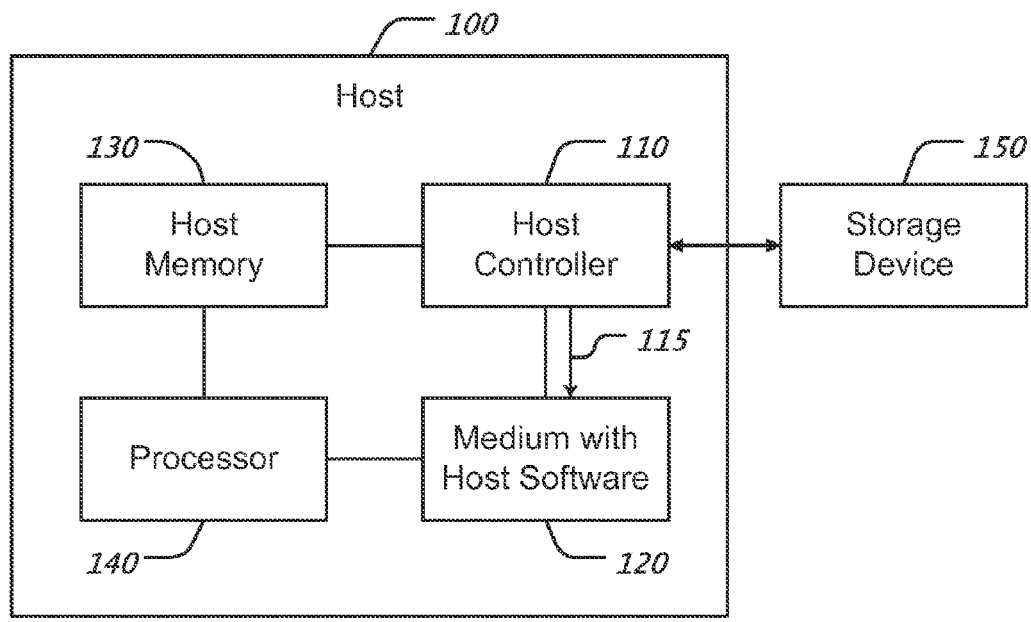
FIG. 1 shows an example of a data processing and storage system.

FIG. 1 shows an example of a data processing and storage system. The system includes a host 100 that communicates with a storage device 150. The storage device 150 is a non-volatile memory device, e.g., a solid state drive, such as described further below. The storage device 150 can include a hardware controller, firmware, or a combination of thereof. In some implementations, the storage device 150 is integrated with the host 100 in a larger device. As will be appreciated, the host 100 and storage device 150 can represent many different types of computing apparatus, e.g., a smart phone, a tablet computer, etc.

The host 100 includes a host controller 110 that interfaces with the storage device 150, and a non-transitory medium 120 encoding host software, to control data transfer (both reading and writing) between the host 100 and the storage device 150. For example, the host controller 110 and the host software 120 can operate to manage data transfer with the storage device 150 in accordance with a standard data transfer protocol, such as eMMC 4.5. In addition to being compatible with an existing standard for data transfer, the host controller 110 and the host software 120 can operate to prepare and process a packed command, which represents multiple commands, in accordance with the systems and methods described herein. For example, the host controller 110 can assert an interrupt 115 to the host software 120 after data transfer for one command of a packed command is completed, but before data transfer for all of the commands of that same packed command is completed.

The host 100 can also include a host memory 130 and a hardware processor 140. The host memory 130 is a non-transitory medium for holding data, and potentially code as well. The host memory 130 can include one or more volatile memory devices, one or more non-volatile memory devices, or both. The hardware processor 140 can be a general purpose microprocessor or a special purpose digital processor.

In some implementations, a host system includes the processor 140 and the host memory 130, and a host bus adapter includes the host controller 110 and the medium with host software 120. In some implementations, these components are more closely integrated. For example, the medium 120 can be part of the host memory 130. In some implementations, the host software encoded in the medium 120 shares the processor 140 with other software programs in a computer system. In other implementations, the host software encoded in the medium 120 has a dedicated hardware processor in a microcomputer system.

Figure 2:
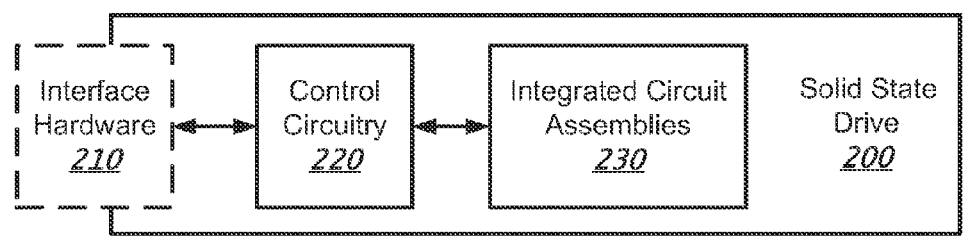
FIG. 2 shows an example of a solid state drive.

FIG. 2 shows an example of a solid state drive (SSD) 200, such as can be used with the system of FIG. 1. The SSD 200 includes integrated circuit assemblies 230 forming memory to store data persistently. In some implementations, integrated circuit assemblies 230 may be "NAND" type flash memory. NAND flash memory generally has faster erase and program times, higher density, lower cost per bit, and more endurance than, for example, NOR-type flash memory. NAND flash memory may utilize series strings of more than two memory cells, such as 16 or 32, connected along with one or more select transistors between individual bit lines and a reference potential to form columns of cells. Word lines may extend across cells within such columns. An individual cell within a column may be read and verified during programming by causing the remaining cells in the string to be turned on so that the current flowing through a string may be dependent upon the level of charge stored in the addressed cell.

SSD 200 includes control circuitry 220 for communicating with integrated circuit assemblies 230. In some implementations, control circuitry 220 includes an embedded processor that executes firmware-level code to bridge the integrated circuit assemblies 230 with the host. For example, control circuitry 220 may include a NAND flash I/O controller for communicating with a NAND memory, and may allow only sequential access to data stored in the NAND flash memory.

SSD 200 includes interface hardware 210 for connecting SSD 200 to a host, such as through a host bus adapter (noted above). In some implementations, interface hardware 210 includes one or more standard connectors. Examples of standard connectors may include, without limitation, SATA (Serial Advanced Technology Attachment), SCSI (Small Computer System Interface), USB (Universal Serial Bus), PCMCIA (Personal Computer Memory Card International Association), IEEE-1394 (Firewire), and MMCs. In some implementations, interface hardware 210 may include multiple pins, each corresponding to a specific function. For example, pins for power, ground, send, receive, transfer complete, communication, and the like. In some implementations, the SSD 200 is an eMMC device.

Figure 3:
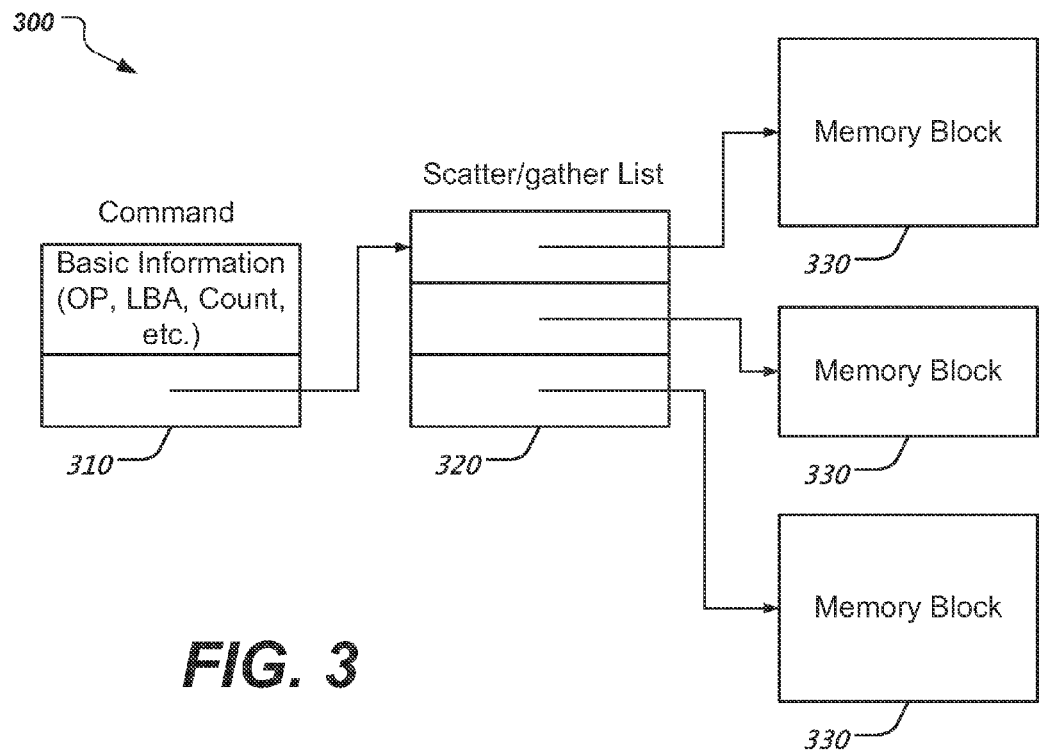
FIG. 3 shows an example of a command description in host memory.

FIG. 3 shows an example of a command description 300 in host memory. A command 310 includes basic information, such as OP (operation, e.g., read or write), LBA (logical block address), COUNT (e.g., bytes of data), etc. The command 310 can also include a pointer to a scatter/gather list 320, and the scatter/gather list 320 includes pointers to memory blocks 330. To process a command, the host controller (e.g., controller 110) typically only sends the basic information to the device (e.g., the storage device 150). When data is received from the device, the host controller can then transfer the received data to the memory blocks 130 described by the scatter/gather list 320.

The scatter/gather list 320 (or similar memory referencing scheme) is used because the host memory locations where data to be read from (or written to) need not be contiguous memory space. Thus, the host prepares and specifies the portion(s) of host memory to be used for a command's operation and indicates those portion(s) to the host controller. This system can likewise be used for packed commands, where the scatter/gather list 320 can specify, for example, a separate block of host memory for each of the commands in the packed command.

Figure 4:
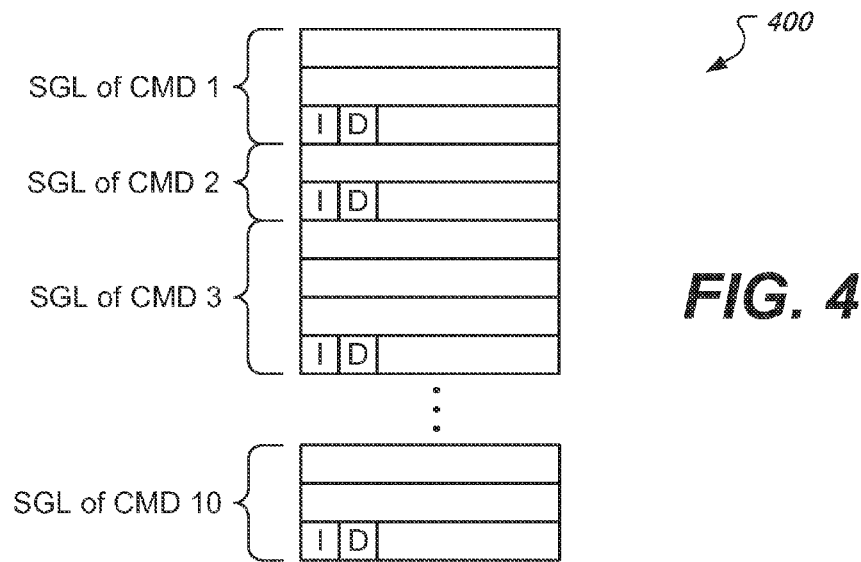
FIG. 4 shows an example of a scatter/gather list with interrupt and done bits specified therein.

FIG. 4 shows an example of a scatter/gather list (SGL) 400. In this example, the host has prepared a larger SGL that describes data locations for each command (CMD) of ten commands in a packed command (SGL of CMD 1, SGL of CMD 2, SGL of CMD 3, [ . . . ], SGL of CMD 10). Even though the host knows the details of the SGL 400, traditionally, the host will not know when the first command finishes because of the interaction between the hardware and the software. The software knows there is more than one command in the packed command, but the hardware will still only see a single command. Thus, the traditional host controller will interrupt the software only after the entire command is completed (e.g., only after the data of a last read command of a packed command is available). In the present disclosure, the hardware is modified such that it will inform the software of a partial completion of a command (e.g., some, but not all, of the data being read has been received and is available for the software to process it).

In some implementations, two reserved bits in the SGL 400 are used as interrupt ("I") and done ("D") bits, which the host can utilize to know a current state of command completion before the command is entirely finished. The I bit is set by the host software to ask the host controller to assert an interrupt when the data described by this element is received. The D bit is set by the host controller before the interrupt is asserted when the data described by this element is received. For example, the host can set the I bit of the last scatter gather element of each command. This implies that when the host receives the command data for a packed command composed of multiple read commands, the host software will be notified by the interrupt asserted by the host controller. The host software can then know which command in the packed command is finished by checking the D bit.

As will be appreciated, there is significant flexibility in this approach. The host software can decide which I bits to set based on the specific commands being combined in the packed command. Moreover, the use of the D bit can simplify the host software's work and can further improve throughput and latency. For example, because of the speed of the hardware, by the time the host software begins reading the SGL in response to the first interrupt initiated by the first command in the packed command finishing, one or more other commands of the packed command may have also finished, and the host software will be able to detect this as well using the D bits (e.g., when the software processes an interrupt, it can start scanning the entire SGL 400 to check which commands are completed). Likewise, one or more additional commands of the packed command may complete while the host software is processing the first set of one or more commands after the first interrupt.

Figure 5A:
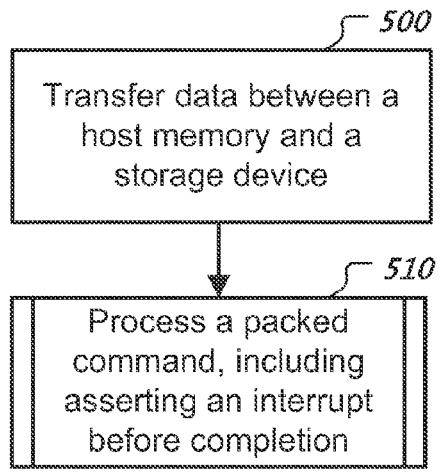
FIG. 5A is a flowchart showing an example of a process performed by a host controller.

FIG. 5A is a flowchart showing an example of a process performed by a host controller. At 500, data is transferred between a host memory and a storage device. This transfer can be a read or a write of data. At 510, a packed command (which represents more than one command) is processed by the host controller. This processing includes reading or writing data using pointers to memory blocks associated with the packed command. For example, the pointers can be in a scatter/gather list, as described above. This processing also includes asserting an interrupt to host software after completion of at least one of the represented commands, but before completion of the entire packed command.

Figure 5B:
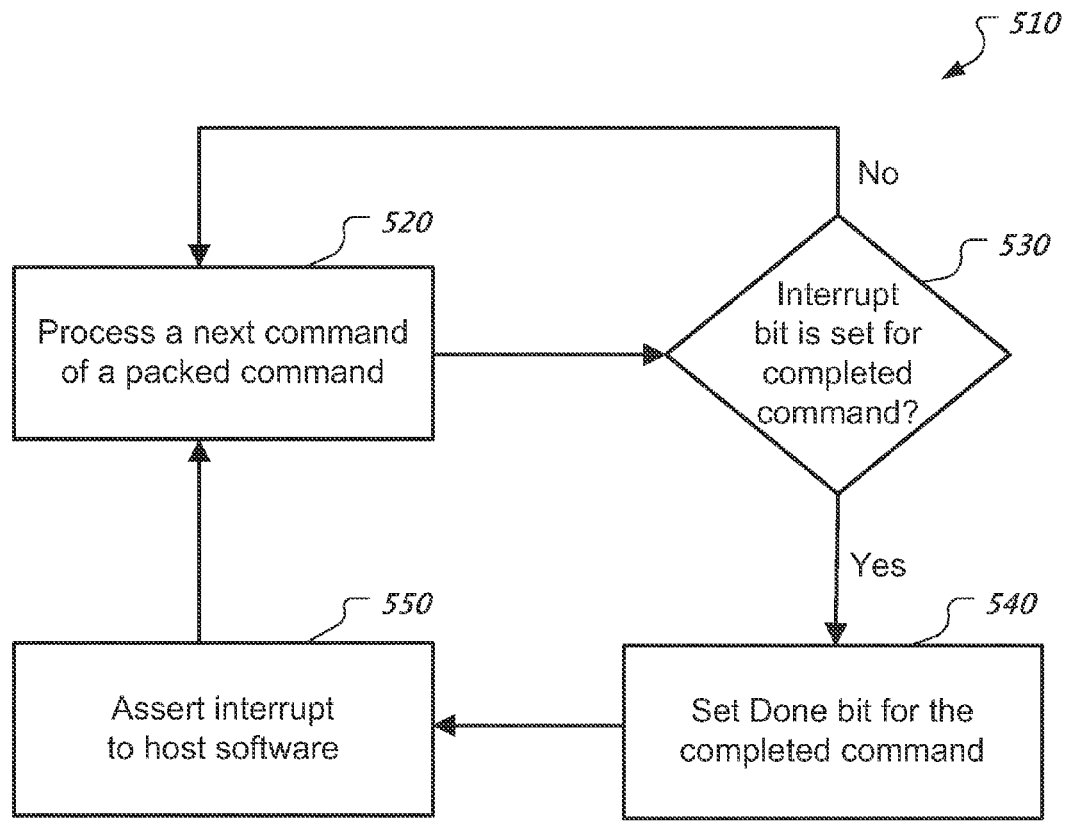
FIG. 5B is a flowchart showing another example of a process performed by a host controller.

FIG. 5B is a flowchart showing an example of processing 510 performed by a host controller. At 520, a next command of a packed command is processed through to completion (e.g., using a scatter/gather list). At 530, an interrupt bit for the completed command is checked to determine whether an interrupt should be asserted. As noted above, the host software can set this interrupt bit to ask the host controller to assert the interrupt. If the interrupt bit for the completed command is not set, the process moves on to the next command at 520.

If the interrupt bit for the completed command is set, a done bit for the completed command is set at 540 (e.g., using the scatter/gather list). Then, an interrupt is asserted at 550. When the host software processes the asserted interrupt, the host software can check for the set done bit to determine that the command of the packed command has finished.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
    a host memory to hold a scatter/gather list containing in respective portions two or more interrupt bits, two or more done bits, and pointers to memory blocks associated with a packed command specifying two or more commands;
    a host controller coupled with the host memory to access the pointers to access the memory blocks associated with the packed command; and
    a storage device coupled with the host controller to send or receive data associated with the packed command provided by the host controller;
    wherein the host controller is configured to check each respective one of the two or more interrupt bits in the host memory that correspond to the two or more commands specified by the packed command and assert at least one interrupt to host software, for at least one command of the two or more commands specified by the packed command in response to a value of at least one of the two or more interrupt bits, after data transfer resulting from processing the at least one command is completed, but before data transfer resulting from processing all of the commands of the packed command is completed;
    wherein the host software sets the value of the at least one of the two or more interrupt bits in the scatter/gather list for the at least one command to ask the host controller to assert the interrupt; and
    wherein the host controller is configured to set one of the two or more done bits in the scatter/gather list for the at least one command before the interrupt is asserted.

2. The system of claim 1, wherein the host software checks the one of the two or more done bits in the scatter/gather list when processing the asserted interrupt.

3. The system of claim 1, wherein the commands of the packed command are ten read commands to read data from the storage device into the memory blocks.

4. The system of claim 1, wherein the storage device comprises an eMMC (embedded MultiMediaCard) flash memory device.

5. A method performed by a host controller, the method comprising:
    transferring data between a host memory and a storage device;
    processing a packed command, which specifies two or more commands, using pointers to memory blocks associated with the packed command, the pointers being contained in a scatter/gather list;
    checking each respective one of two or more interrupt bits that correspond to the two or more commands specified by the packed command, the two or more interrupt bits being contained in the scatter/gather list;
    asserting at least one interrupt to host software, for at least one command of the two or more commands specified by the packed command in response to a value of at least one of the two or more interrupt bits, after data transfer resulting from processing the at least one command is completed, but before data transfer resulting from processing all of the commands of the packed command is completed; and
    setting one of two or more done bits contained in the scatter/gather list for the at least one command before the interrupt is asserted;
    wherein the two or more interrupt bits, the two or more done bits, and the pointers are in respective portions of the scatter/gather list, and the host software sets the value of the at least one of the two or more interrupt bits in the scatter/gather list for the at least one command to ask the host controller to assert the interrupt.

6. The method of claim 5, wherein the host software checks the one of the two or more done bits in the scatter/gather list when processing the asserted interrupt.

7. The method of claim 5, wherein the commands of the packed command are ten read commands to read data from the storage device into the memory blocks.

8. A device comprising:
    a host controller configured to transfer data between a host memory and a storage device; and
    a non-transitory medium encoding host software configured to prepare a packed command, which specifies two or more commands, by loading pointers to memory blocks associated with the packed command into a scatter/gather list in a host memory;
    wherein the host controller is configured to check in the scatter/gather list each respective one of two or more interrupt bits that correspond to the two or more commands specified by the packed command and assert at least one interrupt to the host software, for at least one command of the two or more commands specified by the packed command in response to a value of at least one of the two or more interrupt bits, after data transfer resulting from processing the at least one command is completed, but before data transfer resulting from processing all of the commands of the packed command is completed;
    wherein the host software sets the value of the at least one of the two or more interrupt bits in the scatter/gather list for the at least one command to ask the host controller to assert the interrupt; and
    wherein the host controller is configured to set one of two or more done bits in the scatter/gather list for the at least one command before the interrupt is asserted, and the two or more interrupt bits, the two or more done bits, and the pointers are in respective portions of the scatter/ Rather list.

9. The device of claim 8, wherein the host software checks the one of the two or more done bits in the scatter/gather list when processing the asserted interrupt.

10. The device of claim 8, wherein the commands of the packed command are ten read commands to read data from the storage device into the memory blocks.

11. The device of claim 8, wherein the host controller is configured to interface with an eMMC (embedded MultiMediaCard) flash memory device comprising the storage device.

\* \* \* \* \*